(12) United States Patent
Berstis et al.

(10) Patent No.: US 7,793,231 B2
(45) Date of Patent: Sep. 7, 2010

(54) METHOD AND SYSTEM FOR PROVIDING A PRIMARY WINDOW OVERLAY

(75) Inventors: Viktors Berstis, Austin, TX (US); Randolph M. Forlenza, Austin, TX (US); John P. Kaemmerer, Pflugerville, TX (US)

(73) Assignee: International Business Machines Corporation, Armonk, NY (US)

( * ) Notice: Subject to any disclaimer, the term of this patent is extended or adjusted under 35 U.S.C. 154(b) by 273 days.

(21) Appl. No.: 11/335,441

(22) Filed: Jan. 19, 2006

(65) Prior Publication Data

US 2007/0168878 A1 Jul. 19, 2007

(51) Int. Cl.
*G06F 3/048* (2006.01)
(52) U.S. Cl. .................. 715/791; 715/802
(58) Field of Classification Search ............. 715/791, 715/802
See application file for complete search history.

(56) References Cited

U.S. PATENT DOCUMENTS

| | | | |
|---|---|---|---|
| 5,675,755 A * | 10/1997 | Trueblood | 715/791 |
| 5,721,853 A * | 2/1998 | Smith | 715/803 |
| 6,031,530 A * | 2/2000 | Trueblood | 715/791 |
| 6,072,489 A | 6/2000 | Gough et al. | |
| 6,429,883 B1 | 8/2002 | Plow et al. | |
| 6,587,128 B2 | 7/2003 | Kanevsky et al. | |
| 6,590,583 B2 | 7/2003 | Soohoo | |
| 6,760,048 B1 * | 7/2004 | Bates et al. | 715/797 |
| 7,039,872 B1 * | 5/2006 | Raheman | 715/748 |
| 2005/0125741 A1 * | 6/2005 | Clow et al. | 715/794 |
| 2005/0125742 A1 * | 6/2005 | Grotjohn et al. | 715/799 |
| 2006/0036971 A1 * | 2/2006 | Mendel et al. | 715/856 |
| 2006/0075359 A1 * | 4/2006 | Bauchot et al. | 715/790 |
| 2008/0010608 A1 * | 1/2008 | Adams | 715/781 |

OTHER PUBLICATIONS

M Czerwinski, E Cutrell, E Horvitz, Instant messaging and interruption: Influence of task type on performance, Proceedings of OZCHI, 2000.*

* cited by examiner

*Primary Examiner*—William L Bashore
*Assistant Examiner*—Ashraf Zahr
(74) *Attorney, Agent, or Firm*—William H. Steinberg; Robert C. Rolnik; Cardinal Law Group

(57) ABSTRACT

A method for providing a primary window overlay includes providing a primary window on a desktop and designating an overlay window. The method further includes implanting the overlay window on the primary window, receiving activity input to the primary window, and maintaining the overlay window on top of the primary window. A system for providing a primary window overlay includes providing a primary window on a desktop, designating an overlay window, implanting the overlay window on the primary window, receiving activity input to the primary window, and maintaining the overlay window and receiving activity input to the overlay window on top of the primary window. A computer readable medium can include computer readable code for executing the method steps.

13 Claims, 8 Drawing Sheets

400

FIG. 8    850
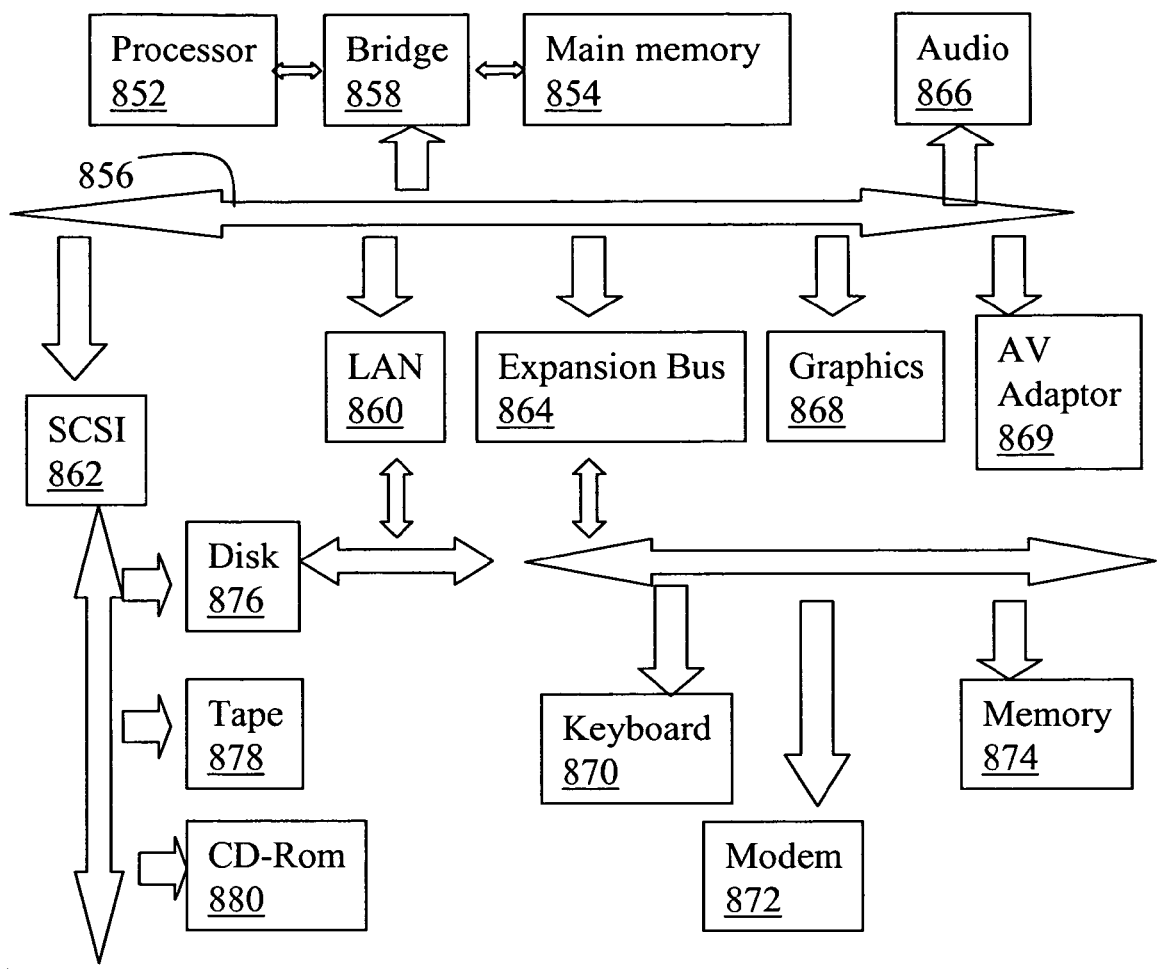

US 7,793,231 B2

METHOD AND SYSTEM FOR PROVIDING A PRIMARY WINDOW OVERLAY

FIELD OF INVENTION

The present invention generally relates to graphical user interfaces. More specifically, the invention relates to primary and overlay windows.

BACKGROUND OF THE INVENTION

Users of graphical user interfaces often operate multiple windows simultaneously. However, use of multiple windows can result in a popup (such as an instant messaging window), stealing focus from the user's current task. For example, while a user is typing or operating a mouse, an instant message window can receive communication and pop to the front, overlaying the user's task.

A user may wish to monitor a particular pop up window, such as instant messaging windows, while working with another application, such as a word processor. When the word processor window is maximized, the user must toggle between the instant messaging window and word processor window to monitor both applications and work with both. Toggling can be either switching windows, or minimizing one window to bring the other window to the front. For example, one popular operating system allows a user to toggle between windows with an 'alt-tab' command.

It is therefore a challenge to develop a method to provide a primary window overlay to overcome these, and other, disadvantages.

SUMMARY OF THE INVENTION

A first embodiment of the present invention is a method for providing a primary window overlay including providing a primary window on a desktop and designating an overlay window. The method further includes implanting the overlay window on the primary window, receiving activity input to the primary window, and maintaining the overlay window and receiving activity input to the overlay window on top of the primary window.

Another embodiment of the invention provides a computer readable medium including computer readable code for providing a primary window overlay including computer readable code for providing a primary window on a desktop, computer readable code for designating an overlay window, computer readable code for implanting the overlay window on the primary window, computer readable code for receiving activity input to the primary window, and computer readable code for maintaining the overlay window and receiving activity input to the overlay window on top of the primary window.

Another embodiment of the invention provides a system for providing a primary window overlay including means for providing a primary window on a desktop, means for designating an overlay window, means for implanting the overlay window on the primary window, means for receiving activity input to the primary window, and means for maintaining the overlay window and receiving activity input to the overlay window on top of the primary window.

The foregoing embodiment and other embodiments, objects, and aspects as well as features and advantages of the present invention will become further apparent from the following detailed description of various embodiments of the present invention. The detailed description and drawings are merely illustrative of the present invention, rather than limiting the scope of the present invention being defined by the appended claims and equivalents thereof.

BRIEF DESCRIPTION OF THE DRAWINGS

FIG. 8 illustrates an example of a computer for use in a method for providing a primary window overlay in accordance with one aspect of the invention.

DETAILED DESCRIPTION OF THE PRESENT INVENTION

Figure 1:
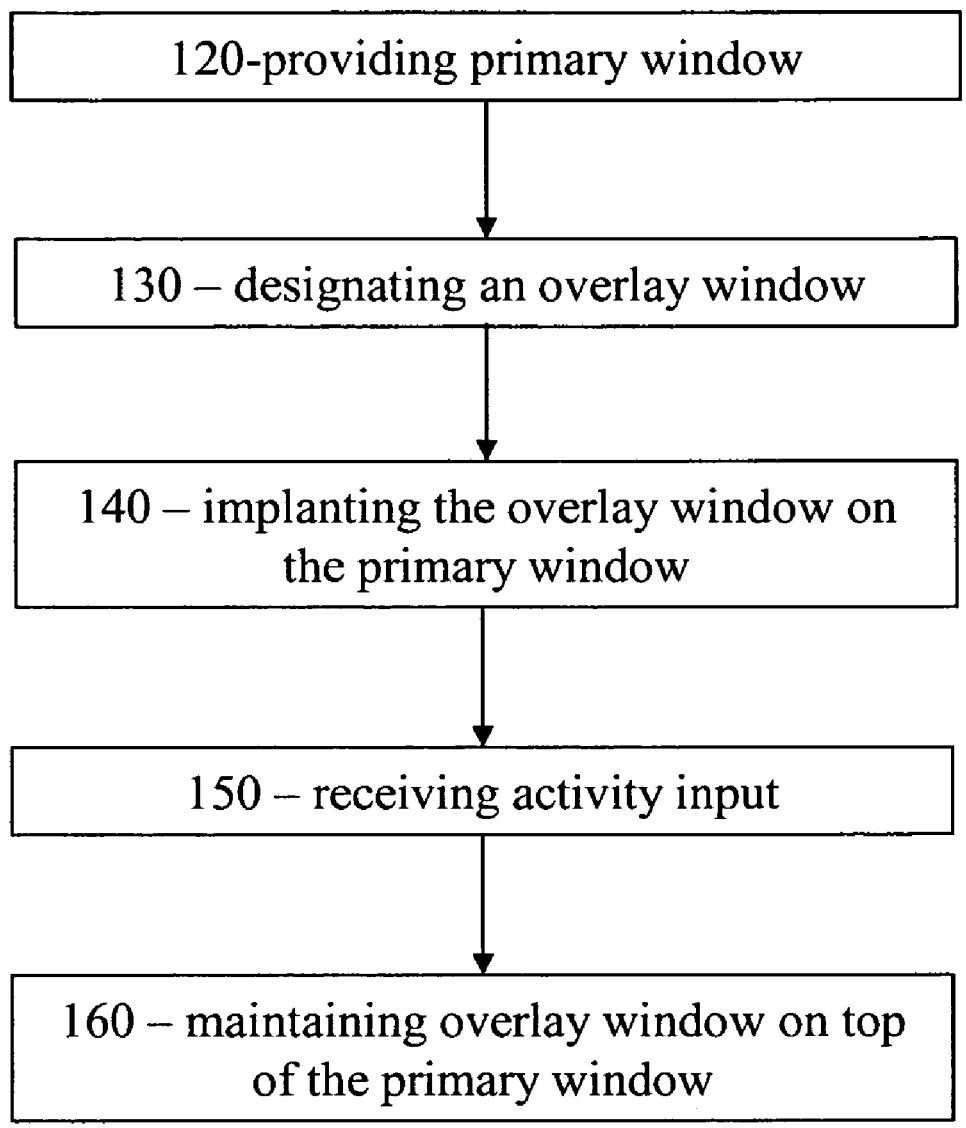
FIG. 1 illustrates one embodiment of a method for providing a primary window overlay in accordance with one aspect of the invention.

FIG. 1 illustrates one embodiment of a method 100 for providing a primary window overlay in accordance with one aspect of the invention.

Method 100 begins at step 120 by selection of a primary window on a desktop. As used herein, a primary window is defined as a window in a graphical user interface of a computer operating a windowed user interface and is running an active program that receives input from a user or provides information to a user. For example, a primary window can run a word processing program.

An overlay window is designated at step 130. An overlay window is a window in a graphical user interface of a computer operating a windowed user interface and running a program that receives input from a user and provides information to a user other than a primary window. An overlay window is operating a secondary, or non-primary application. For example, an overlay window runs an instant messaging program. In one embodiment, the overlay window is substantially opaque so as to obscure a portion of any window operating behind the overlay window. Preferably, the overlay window obscures a portion of a window not near the active focus of any window operating behind the overlay window. In one embodiment, the active focus of a window is determined responsive to a location of a cursor. In another embodiment, the active focus of a window is determined responsive to the location of a mouse pointer.

The overlay window is implanted on the primary window at step 140. Implanting the overlay window results from receiving a command input to implant the overlay window on the primary window. The command input to implant the overlay window can be a mouse click, predetermined combination of keystrokes, a voice command, a right-click, a selection on a menu of commands resulting from a right-click, or any other form of issuing a command input known to those of skill in the art. In one embodiment, implanting the overlay window comprises a drag-and-implant command wherein a right-click command is received and the right-click is maintained while dragging the overlay window to a location within the primary window.

When implanting the overlay window, the computer receives a desired location, termed the implant location, for the implantation within the primary window and maintains the position of the overlay window in the primary window at the implant location. In one embodiment, the implant location is based on a point within the primary window. In another embodiment, the implant location is based on distance from a corner or side of the primary window. In another embodiment, the implant location is based on a distance between more than one point in the primary window, or more than one corner or side of the primary window.

Activity input is received to the primary window at step 150. Receiving activity input includes receiving data or commands from a user to interface with the application or program operating within the primary window. For example, in a primary window executing a word processing program, a user editing the contents of the document is providing, and the window receiving, activity input.

While the activity input is received at the primary window, the overlay window is maintained on top of the primary window at step 160. Maintaining the overlay window on top of the primary window comprises keeping both the primary window and overlay window visible on a computer display while the overlay window partially obscures a portion of the primary window. While the overlay window is maintained on top of the primary window, the overlay window may be moved or resized upon receiving appropriate command inputs. The overlay window may be moved within the primary window, to a different window, or to the desktop.

In addition, maintaining the overlay window on top of the primary window allows input and output, such as activity inputs, to be received and displayed in both the primary and overlay window. The cursor remains in the window receiving the activity input until the cursor is moved to the other window. The focus of the cursor does not alternate between the primary and secondary windows in response to input/output activity in a different window, in one embodiment. For example, when keyboard focus is within the primary window, the receipt of input/output activity in the secondary window does not redirect the focus. In another example, when keyboard focus is within the secondary window, the receipt of input/output activity in the primary window does not redirect the focus from a current window. A current window is defined as a window wherein a cursor is displayed prior to receiving activity input at a different window.

In one embodiment, an operating system operating on the computer and providing each of the windows continues to monitor both the primary window and overlay window for updated information such as commands or data entry and updates the appropriate window.

Figure 2:
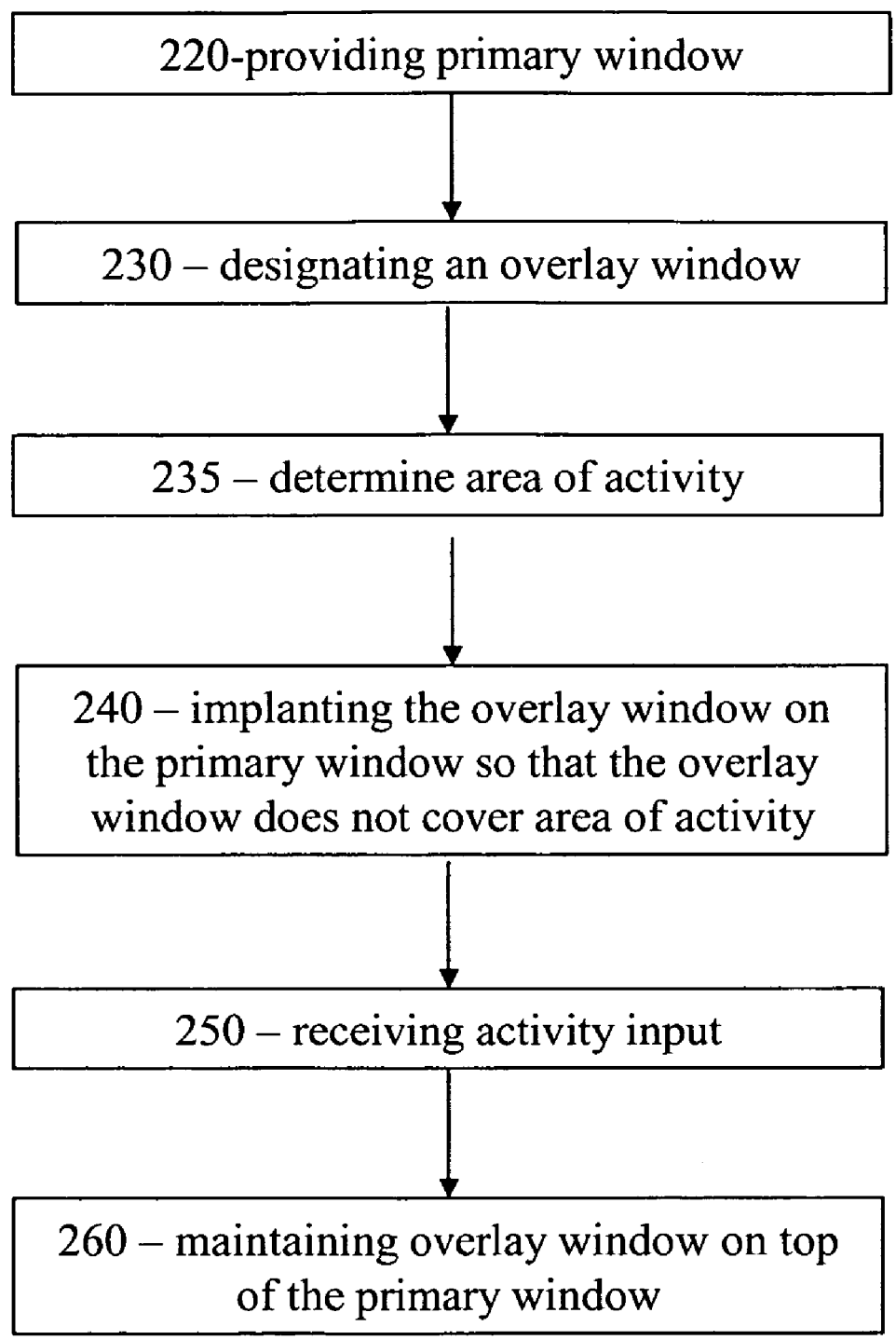
FIG. 2 illustrates another embodiment of a method for providing a primary window overlay in accordance with one aspect of the invention.

FIG. 2 illustrates another embodiment of a method 200 for providing a primary window overlay in accordance with one aspect of the invention. A primary window is provided at step 220. In one embodiment, step 220 is implemented as in step 120. Method 200 designates an overlay window at step 230. In one embodiment, step 230 is implemented as in step 130.

Method 200 determines at least one area of activity at step 235. An area of activity is an area within the primary window that is the focus of processing. For example, an area of activity in a word processing application is the area surrounding the cursor or arrow. In another example, the area of activity in a web browser is any area that features dynamic or changing content, such as a moving graphic. The area of activity can be a predetermined size, user configurable size, or dynamically adjustable based on the type of activity occurring within the area.

Based on the determination of at least one area of activity, method 200 implants the overlay window on the primary window so that the overlay window does not cover an area of activity at step 240. Step 240 is, in one embodiment, implemented in similar fashion as step 140, with the exception of placement and sizing. In one embodiment, the overlay window is resized to minimize any covering of an active area of the primary window after implantation. This resizing can be automatic or based on either predetermined, user, or dynamic changes. In another embodiment, the resizing is based on a user input requesting that the overlay window be resized to minimize interference with an area of activity.

Method 200 receives user input at step 250, and in one embodiment, step 250 is implemented as in step 150. Method 200 maintains the overlay window on top of the primary window at step 260. In one embodiment, step 260 is implemented as in step 160.

Figure 3:
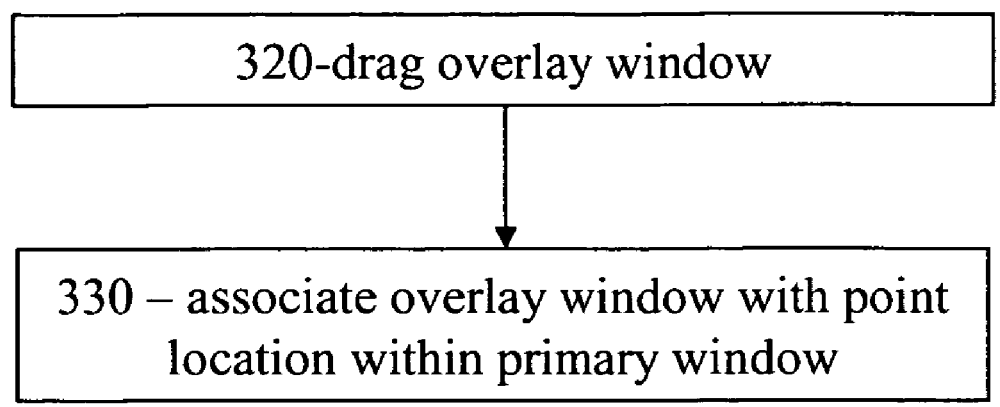
FIG. 3 illustrates another embodiment of a method for designating an overlay window in accordance with one aspect of the invention.

FIG. 3 illustrates an embodiment of a method 300 designating an overlay window in accordance with one aspect of the invention.

At step 320, a dragging command for an overlay window is received wherein the dragging command moves the overlay window to a position overlaying the primary window. Based on the dragging of step 320, method 300 associates the overlay window with at least one point within the primary window at step 330. The association can reflect an actual position (such as 100 pixels from the bottom of the primary window and 100 pixels from the left of the primary window) or a relative position (such as 10% of the window area). In one embodiment, the point is a corner of the primary window. In another embodiment, the point is determined based on a position of an area of activity. In one embodiment, the association includes anchoring the overlay window to the point. Anchoring is defined as maintaining a fixed relationship between a point and an overlay window. Based on this association, the overlay window is implanted during, for example, step 140 of method 100 or step 240 of method 200.

In one embodiment, a size of the overlay window is determined and a size of the primary window is determined. The determined size of the primary window is compared to the size of the overlay window. If the comparison determines that the overlay window is smaller than the primary window, the overlay window is implanted at the desired location. If the comparison determines that the overlay window is larger than the primary window, in one embodiment, the overlay window is fitted within a portion of the primary window, for example by automatically resizing. In another embodiment, based on a determination that the overlay window is larger than the primary window, the overlay window is moved back to the original location of the overlay window. In yet another embodiment, based on a determination that the overlay window is larger than the primary window, the overlay window is implanted at a location wherein the overlay window is partially hidden, such that a portion of the overlay window is visible within the bounds of the primary window, but the portion of the overlay window outside the primary window is hidden as a background window. The determination of outcomes for determined relative window sizes can be a function of user configuration, or can be predetermined as a design choice.

Figure 4:
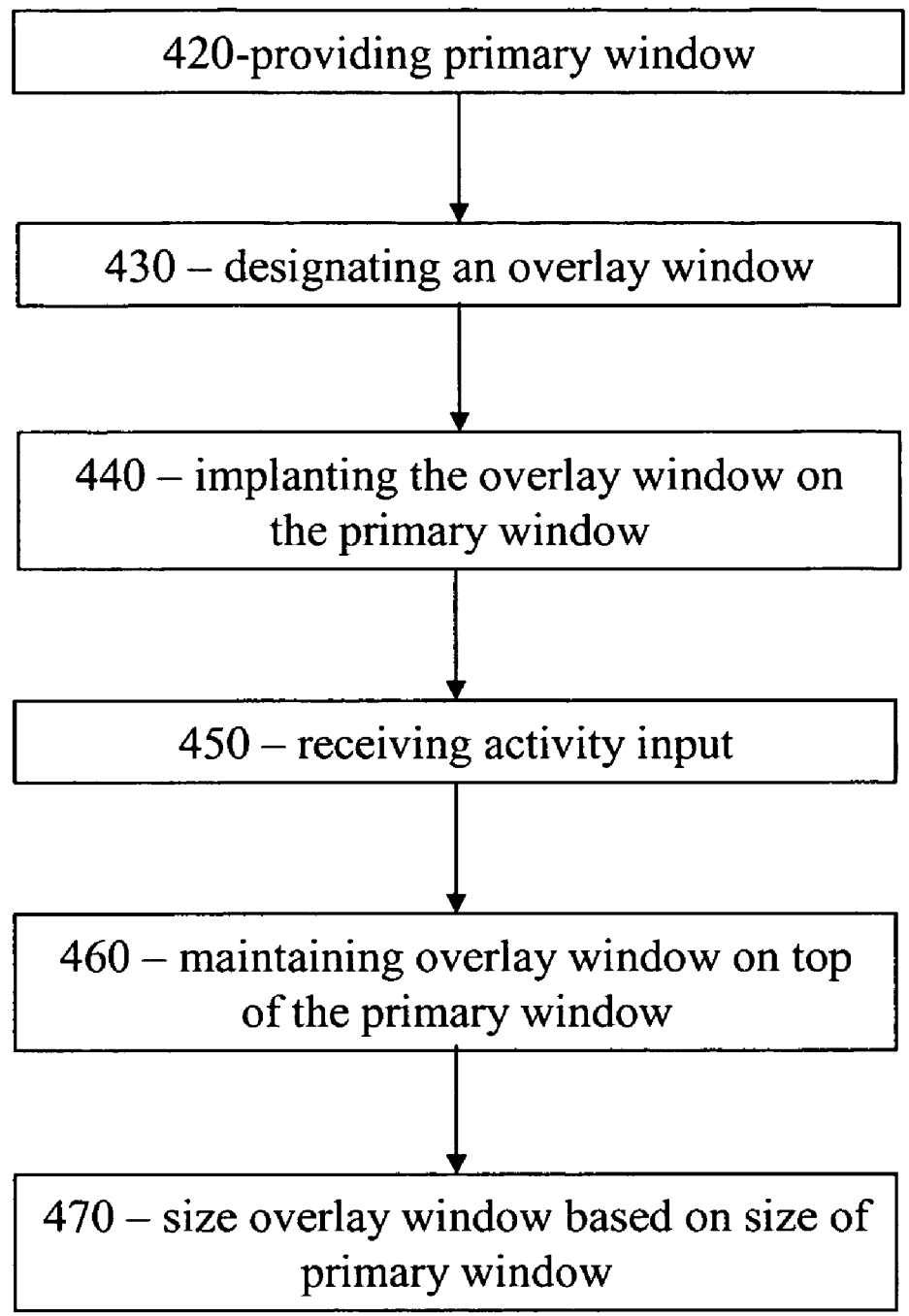
FIG. 4 illustrates another embodiment of a method for providing a primary window overlay in accordance with one aspect of the invention.

FIG. 4 illustrates another embodiment of a method 400 for providing a primary window overlay in accordance with one aspect of the invention. A primary window is provided at step 420. In one embodiment, step 420 is implemented as in step 120. An overlay window is designated at step 430. In one embodiment, step 430 is implemented as in step 130. The overlay window is implanted on the primary window at step 440. In one embodiment, step 440 is implemented as in step 140. Activity input is received at step 450. In one embodiment, step 450 is implemented as in step 150. The overlay window is maintained on top of the primary window at step 460. In one embodiment, step 460 is implemented as in step 160.

Based on the size of the primary window, the size of the overlay window is adjusted at step 470. In one embodiment, the size of the overlay window is automatically adjusted so that the size of the overlay window maintains a fixed ratio to the size of the primary window. In another example, the size of the overlay window is automatically adjusted so that the size of the overlay window does not exceed a threshold size so that the overlay window is not smaller than a particular ratio of sizes, or alternatively so that the overlay window does not exceed a particular ratio of sizes. In yet another embodiment, the size of the overlay window is adjusted based on a ratio of the size of an area of activity to the size of the primary window. In yet another embodiment, the size of the overlay window is adjusted based on a ratio of the size of an area of inactivity to the size of the primary window.

Figure 5:
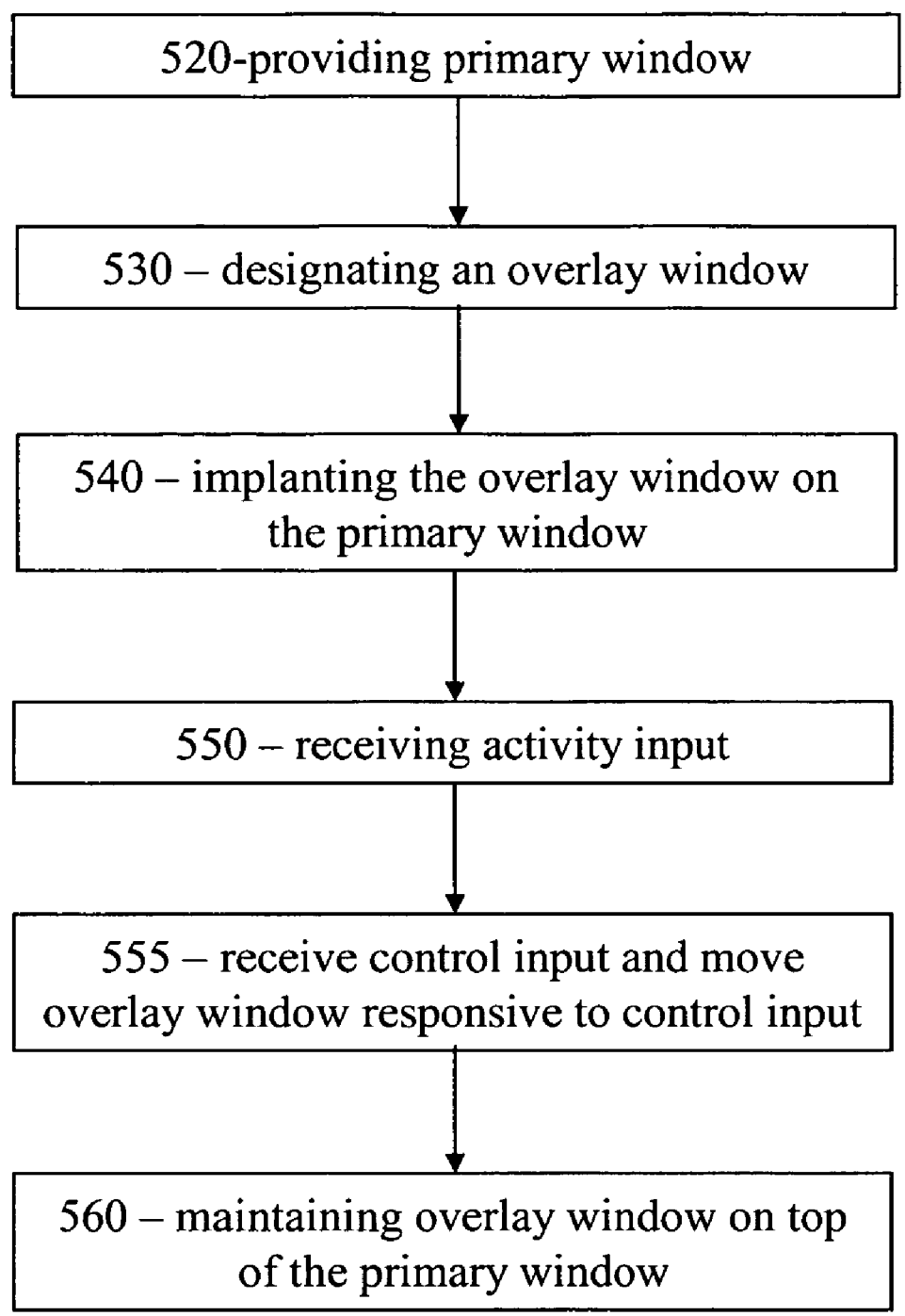
FIG. 5 illustrates another embodiment of a method for providing a primary window overlay in accordance with one aspect of the invention.

FIG. 5 illustrates another embodiment of a method 500 for providing a primary window overlay in accordance with one aspect of the invention. A primary window is provided at step 520. In one embodiment, step 520 is implemented as in step 120. An overlay window is designated at step 530. In one embodiment, step 530 is implemented as in step 130. The overlay window is implanted on the primary window at step 540. In one embodiment, step 540 is implemented as in step 140. Activity input is received at step 550. In one embodiment, step 550 is implemented as in step 150.

In addition to the activity input, control input is received at step 555, and the overlay window is moved responsive to the control input. Control input is received using similar techniques as receiving activity input, with control input configured to move the overlay window within the primary window, or to move the overlay window outside of the primary window, to implant or un-implant the overlay window.

The overlay window is maintained on top of the primary window at step 460. In one embodiment, step 560 is implemented as in step 160.

Figure 6:
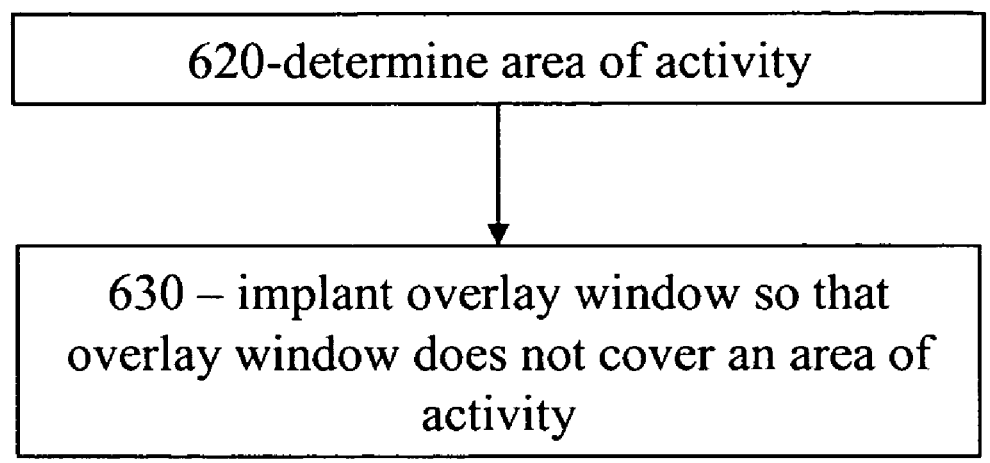
FIG. 6 illustrates an embodiment of a method for implanting an overlay window in accordance with one aspect of the invention.

FIG. 6 illustrates one embodiment of a method 600 for moving an overlay window in accordance with one aspect of the invention. For example, method 600 is executed during step 555 of method 500.

Method 600 determines an area of activity within the primary window at step 620. Based on the determined area of activity, the overlay window is implanted on the primary window so that the overlay window does not cover an area of activity at step 630. For example, in the event that an area of activity is determined, the overlay window will automatically be moved and implanted in a different area so as to reduce the portion of the area of activity that is obscured by the position and/or size of the overlay window. For example, moving the primary window automatically includes moving the overlay window without receiving a specific command input to move the overlay window and/or implant the overlay window at a different location within the primary window. In another embodiment, determining an area of activity includes determining an area of inactivity that is not receiving control or activity inputs.

For example, while performing the inventions disclosed herein, a user is operating a word processor document in a primary window, while operating an instant messaging application in an overlay window. The instant messaging program is dragged and implanted into a portion of the primary window (thus, the word processor), and remains visible to the user at the location in the primary window. For example, the overlay window is placed near the top of the primary window, as the user maximizes the primary window, and enters activity input at the bottom of the primary window. As the activity input is entered, the document scrolls, and the activity input that was previously located at the top of the primary window scrolls off the top of the primary window. Despite this scrolling, the overlay window remains visible to the user over the primary window. As the user continues entering activity and/or control inputs, the user enters activity inputs near the overlay window (creating an area of activity), and the overlay automatically moves to an area where the overlay window will not obscure an area of activity. The overlay window can be freely moved around the primary window and can be resized or un-implanted and moved outside of the primary window.

Furthermore, in one embodiment, upon the user exiting the application executing in the primary window, the overlay window will automatically un-implant from the primary window, and remain in position, but the position will now be based on the display or desktop rather than the primary window.

Figure 7:
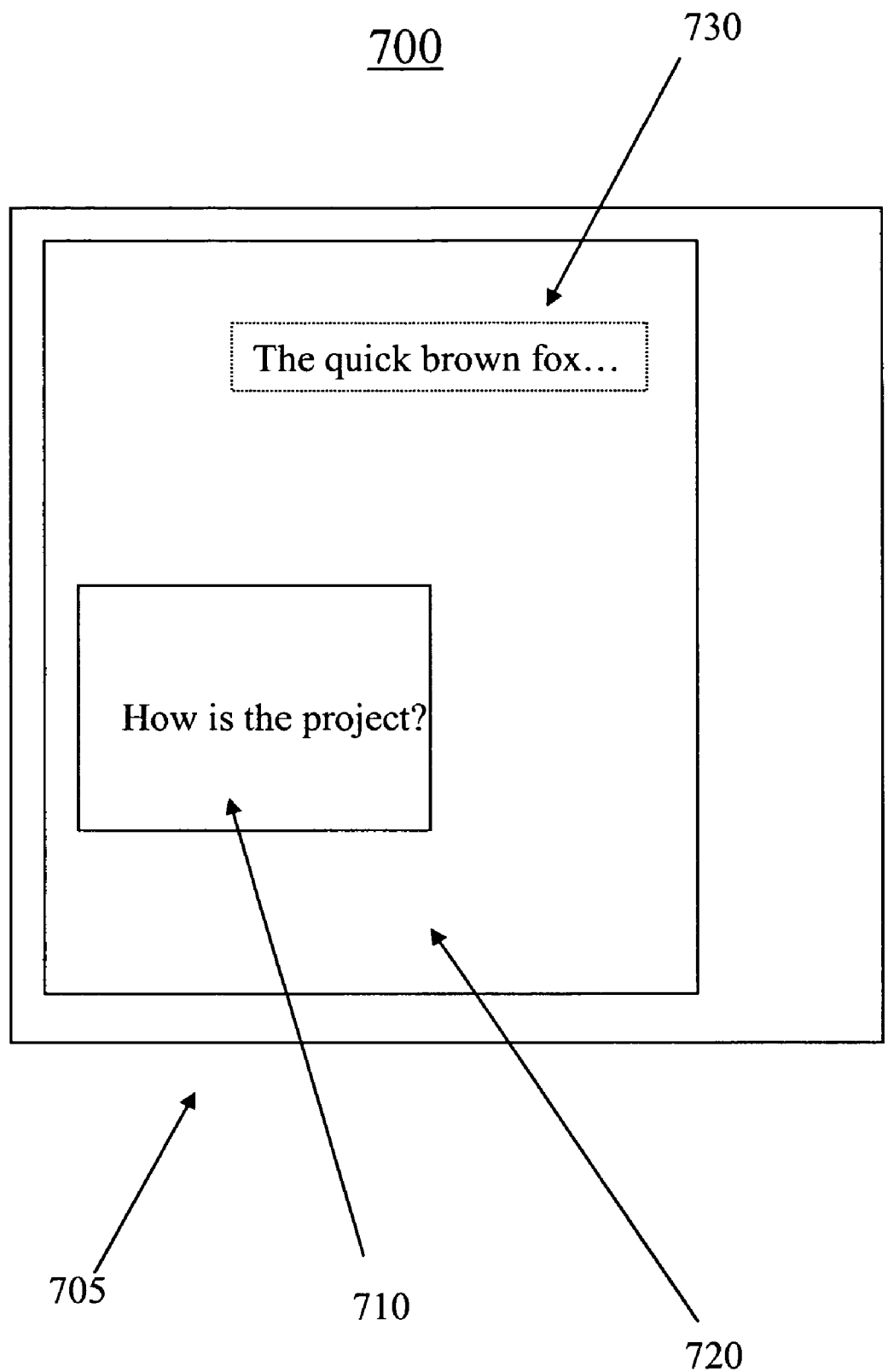
FIG. 7 graphically illustrates an embodiment of a overlay window and area of activity in accordance with one aspect of the invention.

FIG. 7 graphically illustrates an overlay window overlaying a primary window at 700. Overlay window 710 is implanted in primary window 720 that is visible on desktop 705. Area of activity 730 is receiving activity inputs, and overlay window 710 is implanted so that overlay window is not covering the area of activity 730.

FIG. 8 illustrates one embodiment of a computer client 850 for use in accordance with one aspect of the invention. Computer system 850 employs a peripheral component interconnect (PCI) local bus architecture. Although the depicted example employs a PCI bus, other bus architectures such as Micro Channel and ISA may be used. PCI bridge 858 connects processor 852 and main memory 854 to PCI local bus 856. PCI bridge 858 also may include an integrated memory controller and cache memory for processor 852. Additional connections to PCI local bus 856 may be made through direct component interconnection or through add-in boards. In the depicted example, local area network (LAN) adapter 160, SCSI host bus adapter 862, and expansion bus interface 864 are connected to PCI local bus 856 by direct component connection. In contrast, audio adapter 166, graphics adapter 868, and audio/video adapter (A/V) 869 are connected to PCI local bus 856 by add-in boards inserted into expansion slots. Expansion bus interface 864 connects a keyboard and mouse adapter 870, modem 872, and additional memory 874 to bus 856. SCSI host bus adapter 862 provides a connection for hard disk drive 876, tape drive 878, and CD-ROM 880 in the depicted example. In one embodiment, the PCI local bus implementation support three or four PCI expansion slots or add-in connectors, although any number of PCI expansion slots or add-in connectors can be used to practice the invention.

An operating system runs on processor 852 to coordinate and provide control of various components within computer system 850. The operating system may be any appropriate available operating system such as Windows, Macintosh, UNIX, AIX, HP-UX, LINUX, or OS/2, which is available from International Business Machines Corporation. "OS/2" is a trademark of International Business Machines Corporation. Instructions for the operating system, an object-oriented operating system, and applications or programs are located on storage devices, such as hard disk drive 176 and may be loaded into main memory 854 for execution by processor 852.

Those of ordinary skill in the art will appreciate that the hardware in FIG. 8 may vary depending on the implementation. For example, other peripheral devices, such as optical disk drives and the like may be used in addition to or in place of the hardware depicted in FIG. 8. FIG. 8 does not illustrate any architectural limitations with respect to the present invention, and rather merely discloses an exemplary system that could be used to practice the invention. For example, the processes of the present invention may be applied to multi-processor data processing system.

Many secondary windows can be implanted into a single primary window. Additionally, a secondary window relative to a primary window can function as a primary window for a third window.

The invention can take the form of an entirely hardware embodiment, an entirely software embodiment, or an embodiment containing both hardware and software elements. In a preferred embodiment, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device), or a propagation medium such as a carrier wave. Examples of a computer-readable medium include a semiconductor or solid-state memory, magnetic tape, a removable computer diskette, a random access memory (RAM), a read-only memory (ROM), a rigid magnetic disk and an optical disk.

While the embodiments of the present invention disclosed herein are presently considered to be preferred embodiments, various changes and modifications can be made without departing from the spirit and scope of the present invention. The scope of the invention is indicated in the appended claims, and all changes that come within the meaning and range of equivalents are intended to be embraced therein.

We claim:

1. A method for providing a primary window overlay, the method comprising:
   providing a primary window on a desktop;
   designating an overlay window, wherein designating comprises:
   receiving a dragging command to move the overlay window to a position overlaying the primary window; and
   associating the overlay window with at least one point within the primary window;
   determining at least one area of activity;
   implanting the overlay window on the primary window so that the overlay window does not cover the at least one area of activity, wherein the at least one area of activity is an area surrounding a cursor and edits to contents of a document;
   receiving the at least one area of activity input to the primary window;
   maintaining the overlay window;
   receiving activity input to the overlay window on top of the primary window, wherein receiving activity input to the overlay window does not change a focus from the primary window; and
   sizing the overlay window based on a ratio of a size of the at least one area of activity to a size of the primary window, and wherein the document is a word processor document.

2. The method of claim 1 wherein the overlay window runs an instant messaging program.

3. The method of claim 1 further comprising determining at least one area of activity, and wherein implanting the overlay window on the primary window comprises implanting the overlay window so that the overlay window does not cover the at least one area of area of activity.

4. The method of claim 1 wherein designating an overlay window comprises receiving a dragging command to move the overlay window to a position overlaying the primary window and associating the overlay window with at least one point within the primary window.

5. The method of claim 1 further comprising moving the overlay window within the primary window responsive to a control input within the primary window, wherein the control input is configured to move the overlay window within the primary window.

6. The method of claim 5 wherein moving the overlay window comprises determining the at least one area of activity, and wherein moving the overlay window on the primary window comprises implanting the overlay window so that the overlay window does not cover the at least one area of activity.

7. The method of claim 1 wherein receiving activity input to the overlay window does not change a focus from the primary window.

8. A computer usable storage medium including computer readable code for providing a primary window overlay, the computer usable storage medium comprising:
   computer readable code for providing a primary window on a desktop;
   computer readable code for designating an overlay window, wherein computer readable code for designating comprises:
   computer readable code for receiving a dragging command to move the overlay window to a position overlaying the primary window; and
   computer readable code for associating the overlay window with at least one point within the primary window;
   computer readable code for determining at least one area of activity;
   computer readable code for implanting the overlay window on the primary window so that the overlay window does not cover the at least one area of activity, wherein the at least one area of activity is an area surrounding a cursor and edits to contents of a document
   computer readable code for receiving the at least one area of activity input to the primary window;
   computer readable code for maintaining the overlay window;
   computer readable code for receiving activity input to the overlay window on top of the primary window, wherein the overlay window runs an instant messaging program, and wherein receiving activity input to the overlay window does not change a focus from the primary window; and computer readable code for sizing the overlay window based on a ratio of size of the area of activity to a size of the primary window, and wherein the document is a word processor document.

9. The computer usable storage medium of claim 8 wherein the overlay window runs an instant messaging program.

10. The computer usable storage medium of claim 8 further comprising computer readable code for determining the at least one area of activity, and wherein computer readable code for implanting the overlay window on the primary window comprises computer readable code for implanting the overlay window so that the overlay window does not cover the at least one area of activity wherein the area of activity is a moving graphic.

11. The computer usable storage medium of claim 8 wherein computer readable code for designating an overlay window comprises computer readable code for dragging the overlay window to a position overlaying the primary window and computer readable code for associating the overlay window with at least one point within the primary window.

12. The computer usable storage medium of claim 8 further comprising computer readable code for moving the overlay window within the primary window responsive to a control input within the primary window, wherein the control input is configured to move the overlay window within the primary window.

13. The computer usable storage medium of claim 12 wherein computer readable code for moving the overlay window comprises computer readable code for determining the at least one area of activity, and wherein computer readable code for moving the overlay window on the primary window comprises computer readable code for implanting the overlay window so that the overlay window does not cover the at least one area of activity.

* * * * *